Nov. 18, 1952 R. B. STREETS 2,618,103
PROCESS FOR TREATMENT OF COTTON SEED AND THE LIKE
Filed July 4, 1945 2 SHEETS—SHEET 1
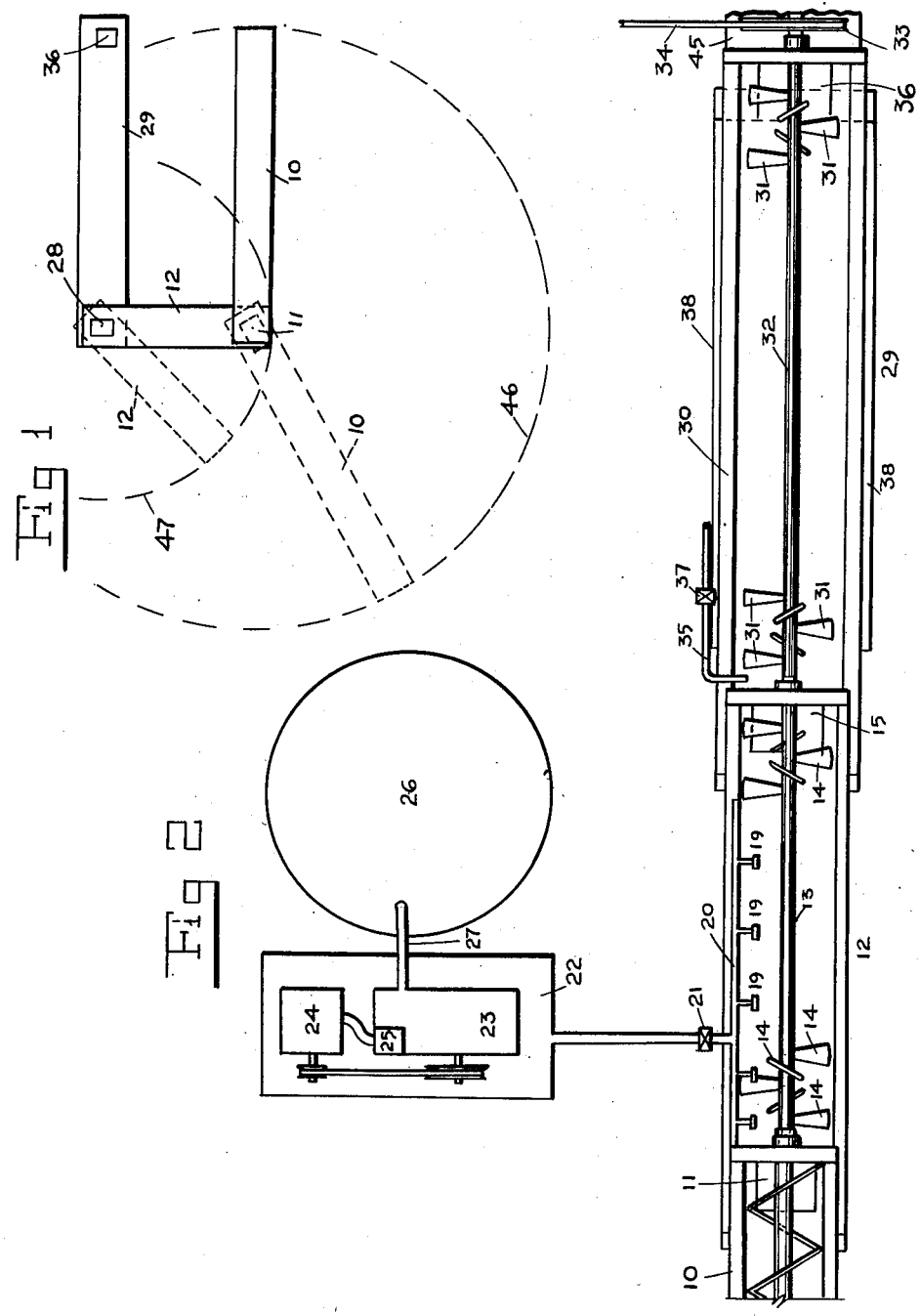
INVENTOR.
RUBERT B. STREETS
BY
Van Deventer & Grier
ATTORNEYS Nov. 18, 1952  R. B. STREETS  2,618,103
PROCESS FOR TREATMENT OF COTTON SEED AND THE LIKE
Filed July 4, 1945   2 SHEETS—SHEET 2
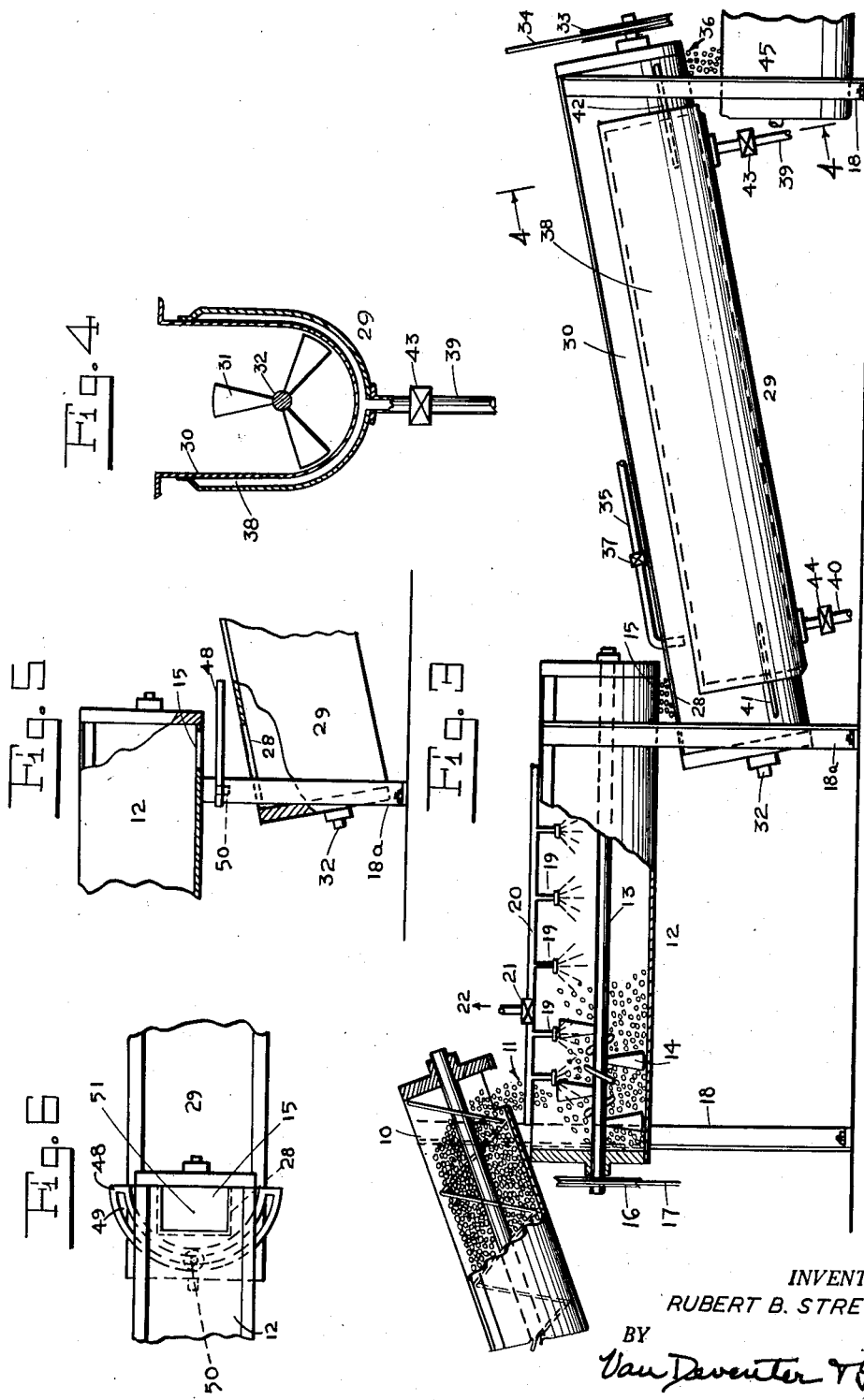
INVENTOR.
RUBERT B. STREETS
BY
ATTORNEYS

Patented Nov. 18, 1952

2,618,103

UNITED STATES PATENT OFFICE 2,618,103

PROCESS FOR TREATMENT OF COTTON SEED AND THE LIKE

Rubert B. Streets, Tucson, Ariz., assignor to Chemical Seed Treating and Delinting Corporation, a corporation of Arizona Application July 4, 1945, Serial No. 603,134

1 Claim. (Cl. 47—58)

This invention relates to a process of acid-delinting seeds, such as cotton seed, prior to planting: (1) for the control of cotton diseases borne externally on the seed; (2) to permit accurate grading of seed to improve its quality and germination; (3) to permit easier planting and more uniform spacing of seed with elimination or reduction of labor in chopping; (4) to secure more rapid germination and more uniform stands with a saving in the amount of seed necessary; and (5) to secure higher yields due to more complete utilization of the land by a more uniform stand of plants.

A patent illustrative of a method of accomplishing the foregoing objects is Number 2,308,883, dated January 19, 1943, which discloses a continuous process of delinting seed wherein the seed is treated by acid to remove the lint; the acid is washed from the seed, good and bad seeds are separated, and the seeds are dried.

The instant invention relates to a method of this general description and includes more particularly the step of pre-wetting the cotton seed before it is subjected to the action of acid as described in the aforesaid patent, and has for its object making the process more expeditious and considerably cheaper.

Other objects will be apparent from the following specification and drawings which describe and show an apparatus or device that can be used to practice the process herein described and claimed.

In the accompanying drawings:

Figure 1 is a diagram showing how various elements of the apparatus may be associated;

Figure 2 is a plan view of the apparatus;

Figure 3 is a vertical sectional view of the apparatus, Figure 2;

Figure 4 is a sectional view on the line 4—4 of Figure 3;

Figure 5 is a vertical sectional view of a modification in the framework of the apparatus, Figures 2 and 3; and Figure 6 is a plan view of the modification shown in Figure 5.

In delinting cotton seed as described in the aforesaid patent it is necessary to apply enough concentrated acid (not less than 75% acid by weight) to the seed (while it is stirred to facilitate distribution of the acid) to wet all of the lint in order that the lint be completely removed from the seed. Since the short lint remaining on the seed after ginning is matted and difficult to wet (owing to entrapped air, etc.) it has been necessary to remove the lint on the seed (about 200 lbs. per ton of seed) and to wet the surface of the seed coats. Laboratory tests have shown a ratio of 4 to 5 lbs. of seed delinted by 1 lb. of acid, while commercial operations have shown ratios of 2 to 3 lbs. of seed per pound of acid. The cost of acid is the greatest expense in this delinting process, and its reduction is a matter of great importance to operators of acid-delinting plants. Also, at the present time, the availability of ample supplies of acid is uncertain and its efficient use is important to enable plants to continue operation.

Previous efforts to save acid and improve delinting revealed that heating of the acid greatly facilitated the delinting and saved some acid, and this process has been generally adopted, and is disclosed in the aforesaid patent, but further improvement was much desired.

In order to practice the method herein disclosed it is desirable but not strictly necessary in each instance to make certain tests on the seeds. If a given lot of seed is pre-wetted by subjecting it to a water spray in a continuous process such as that described in the aforesaid patent and before the seed is delivered to the delinter wherein it is treated with acid, and a suitable dye, such as cotton blue or gentian violet is added to the water that will dye the lint, the distribution of the water on the lint can be observed. The distribution will not be uniform in most cases and the water is largely restricted to the surface of the matted lint due to the phenomena of surface tension and the resistance of the fibres to wetting for other reasons.

Delinting tests on seeds pre-wetted with water before they are delinted show a reduction in the amount of acid used, and such pre-wetting is therefore of value in connection with the process of delinting seed using acid.

If now, a suitable wetting agent is added to the dyed water used for pre-wetting the seeds, a much better penetration and more rapid and uniform wetting will be secured.

The term "wetting agent" used herein is intended to refer to a substance which may be added to water to increase the spreading and penetrating action thereof. Such chemical agents are commonly termed "wetting agents" as distinguished from plain water or other solutions and are used in addition to the water or solution to bring about a more rapid action or penetration of the water or other solution.

Delinting tests on seeds pre-wetted with an aqueous solution of a suitable wetting agent before acid delinting will show three definite advantages as compared with seeds where this step is omitted.

(1) A saving of one half or more of acid required to delint the seed;

(2) Elimination of the necessity for heating the acid (as described for example in the aforesaid patent), as the chemical heat generated by contact of the concentrated acid and water applied to the seed raises the temperature of the seed-acid mixture to the range of rapid and efficient delinting (120–145° F.); and (3) More rapid delinting, as the lint is all wetted more quickly and delinting proceeds at optimum temperatures.

The amount of wetting of the seed, while not critical and permitting of considerable variation, must be kept within certain limits. If too little solution is applied, acid consumption is not much reduced and the speed of delinting is retarded. If too much solution is applied, the acid is diluted by the excess of water in the lint and is reduced to a concentration lower than 75 percent by weight, and delinting is incomplete. The proper amount of pre-wetting will depend upon the pounds of lint per ton of seed, so will vary with different varieties and lots of cotton seed, but can be readily determined for each lot by proceeding as just described.

A number of wetting agents can be used, some of these containing compound hydrophilic and hydrophobic molecules. The former draws the agent into water or is attracted to surfaces which are the more polar. The latter part of the molecule tends to leave the water and attach itself to or dissolve in an oil or other non-polar medium. These substances have the ability to lower surface tension and interfacial tension.

Among such substances and suitable for use in the process herein described and claimed, and given here merely by way of illustration, as any suitable wetting agent may be used, are:

(A) Sodium salt of an alkyl naphthalene sulphonic acid.

(B) A dioctyl ester of sodium sulpho succinate.

(C) A dioctyl ester of sodium sulfo succinate plus sodium sulfate.

(D) Sodium salt of an alkyl naphthalene sulfonic acid.

(E) A dioctyl ester of sodium sulpho succinate.

(F) Ester of a sulphonated bicarboxylic acid dispersed in water.

(G) Ester of a sulphonated bicarboxylic acid, 10% plus an inert organic diluent.

(H) A dihexyl ester of sodium sulpho succinate.

(I) Sulphonated aromatic ether alcohol.

These and other suitable wetting agents are described in "A List of Commercially Available * * * Wetting * * * Agents," mimeographed paper E-504 issued by the U. S. Dept. of Agriculture, Bureau of Entomology and Plant Quarantine, in June 1940. Suitable wetting agents are well known and are in extended use as wetting agents per se.

The wetting solution is preferably applied to the seed under pressure via a spray.

The solution may contain .1% of 10% of (A), (B) or (C) above or .04% of 25% of (A), (B) or (C) above. A dye, as before mentioned, can be added to enable the distribution of the solution to be determined as a matter of convenience when first adjusting the device, but is not necessary after satisfactory performance has been attained. The seed, after being treated as just described, is passed into a delinter.

Here, concentrated sulphuric acid combines readily with the water in the wetting agent and considerable heat is generated by the combination. The amount of heat thus generated has important effects: (1) It eliminates the necessity of heating the acid to secure rapid and efficient delinting; and (2) it increases the speed of chemical reaction by which the lint is removed from the cotton seed.

The temperature of the seed-acid mixture in the delinter unit is increased by several factors: (1) An increase in the amount of seed (and acid) passing through the delinter per unit of time (tons per hour); (2) an increase in the amount of wetting solution applied to the seed (within practical limits); (3) an increase in air temperatures at which the plant operates; and (4) possibly with an increase in the amount of acid used per pound of seed.

The additional heat developed by an increase from one to two tons of seed treated per hour increased the temperature of the seed-acid mass sufficiently to make a method heat control desirable as a safety measure to avoid the possibility of injury to the germinating power of the seed from temperatures over 150 degrees F. This temperature is set arbitrarily as a safe operating limit, and a water-jacket is added to the delinter to provide for cooling same and its contents.

A suitable apparatus for carrying out the aforesaid process is shown in the accompanying drawings, wherein the numeral 10 denotes a suitable conveyor or feeder adapted to deliver seeds to the intake end 11 of the treating tank 12. The tank 12 may be of any suitable construction, either open at the top or closed, and revolvably positioned therein is the shaft 13 having throughout its length in the tank a plurality of paddles 14 which are adjustable and normally set at an angle of 15 to 20 degrees from a perpendicular to the axis of rotation of shaft 13.

By varying the speed of shaft 13 and the adjustment of the paddles, seeds can be caused to progress from the intake end 11 to the outlet 15 of tank 12, being urged to do so by the paddles, the individual seeds being separated as much as possible the while. This fluffy loose condition of the seeds is quite different from the condition that exists in an ordinary feeder conveyor such as 10, wherein the seeds may be in a solid "roll" or mass as they are fed along and through the conveyor. In the tank 12 the seeds should be as loose and free as possible to permit the lint on each seed to be thoroughly wetted by the wetting agent.

The shaft 13 is driven in any suitable manner such as by pulley 16 and belt 17, the latter being driven by a motor (not shown) which may be equipped with any suitable form of variable speed control enabling the operator to select any speed for shaft 13, say from 40 to 160 R. P. M.

The driving means, such as the motor referred to, can be mounted on the framework 18 of the device, which framework also supports tank 12, usually in a horizontal position. However, tank 12 will operate at an angle and the discharge end 15 thereof is usually from 2 to 3 inches lower than the intake 11 thereof.

Above the body of seeds in tank 12 is placed a plurality of nozzles 19 having a common supply pipe 20 in which is a regulating valve 21 adapted to control the flow of liquid from a supply tank 22 where liquid is maintained under the desired pressure by a pump 23 driven by a motor 24. A control switch and valve 25 operates in the usual manner to keep tank 22 supplied with liquid from the mixing tank 26 via pipe 27 and to maintain uniform pressure in tank 22.

The atomizing nozzles 19 are spaced along the tank 12 to evenly spray seeds traversing the tank. They may have a capacity of from 5 to 7.5 gallons per minute per nozzle at 40 pounds per square inch gauge pressure. The number and capacity of the nozzles can be varied to provide the proper amount of liquid for any given lot of seed.

Wet seeds discharged from the outlet 15 of tank 12 fall into the inlet 28 of the delinter 29 which may be of any suitable construction to treat the seeds with acid. Preferably this delinter is of the general construction described in the U. S. patent heretofore mentioned and consists of a tank casing 30 having therein paddles 31, a shaft 32, and driving means 33, 34 therefor, the same as the corresponding paddles, shaft and driving means just described in connection with tank 12.

The delinter has one or more inlet pipes 35 (which may be equipped with nozzles) to deliver acid to the seed traversing the delinter to delint the seed, as more fully described in the patent aforesaid. The paddles 31 are adjusted as to angle and speed to insure a thorough mixing of the wetted seed and acid as the seeds are moved through the delinter to the outlet 36 thereof.

A valve 37 in the acid inlet pipe 35 can be used to regulate the supply of acid.

The belt 34 can be driven by a motor (not shown) mounted on framework 18, or belt 34 can be driven by the motor that drives the belt 17. As many suitable arrangements whereby the framework supports the driving motor or motors and the speed changers are known, and as it is immaterial that any specific arrangement be used, these details are not shown.

The delinter is provided with a water jacket 38 having a supply pipe 39 and drain pipe 40. By circulating cooling water through this jacket and observing the thermometers 41, 42, located at each end of the jacket, the temperature of the seeds in the delinter can be maintained between 120° and 145° F. for efficient and safe operation.

The valves 43, 44, in the supply pipe 39 and drain 40 may be set to regulate the flow of water and consequent temperature of the water jacket and, obviously, these may be thermostatically controlled if desired. Usually 43 is left open and regulation accomplished by valve 44.

After treatment in the delinter the seeds are forced out of the outlet 36 thereof and drop into a suitable washer 45 where they are washed free of lint and acid, as more fully described in the before-mentioned patent. At the washing and subsequent drying of the seeds after they leave the delinter may be accomplished in any manner, these steps will not be described in detail.

While the feeder 10, treating tank 12 and delinter 29 are shown in Figures 2 and 3 as arranged end-to-end in line, it will be understood that by a suitable construction of frame 18 these units— because of their arrangement of inlets and outlets, and because of separate paddle shafts 13, 32— may be grouped in many other relative positions. One such position is shown in Figure 1, where the feeder 10, tank 12 and delinter 29 may be positioned as shown in solid lines. However, the feeder may be swung about the tank as shown by the arc 46, or the tank may be swung about the delinter as shown by the arc 47. Obviously, the relative positions of these three elements may be varied within wide limits without changes in their mechanical construction.

Referring to Figures 5 and 6, the framework adjacent the points where one of the units such as 10, 12, 29, is associated with another, each pair of uprights (one of which is shown at 18ª) carries a track 48 at its upper end. The track has a slot 49 into which projects a bolt 50 secured to the under side of the topmost unit—say 12, for example. As the outlet 15 of tank 12 is positioned above the inlet 28 of the delinter 29, the tank may be swung around the center 51 of the outlets without affecting them, and the tank 12 can therefore be positioned anywhere on the line 47 of Figure 1.

The arrangement just described can be applied where the conveyor 10 empties into the tank 12 and where the latter empties into the delinter 29, and where the latter empties into the washer 45 to permit any desired grouping of the apparatus.

The vertical members 18, 18ª of the frame are secured together by horizontal members or are bolted to a common platform so that the framework may be a unit if desired.

What is claimed is:

In a continuous process of delinting seed wherein the seed is subjected to the action of acid, the step of pre-wetting the seed before subjecting it to the acid which comprises treating the seed with a mixture of a water soluble dye and a chemical wetting agent in said water wherein the dye acts upon the lint so that the extent to which it is affected by the wetting agent can be visually determined.

RUBERT B. STREETS.

REFERENCES CITED

The following references are of record in the file of this patent:

UNITED STATES PATENTS

| Number | Name | Date |
|---|---|---|
| 71,499 | Kirkman | Nov. 26, 1867 |
| 304,147 | Taylor | Aug. 26, 1884 |
| 695,305 | Green | Mar. 11, 1902 |
| 858,075 | Kitsee | June 25, 1907 |
| 1,696,199 | Gunther | Dec. 25, 1928 |
| 1,921,546 | Sibley | Aug. 8, 1933 |
| 1,947,320 | Truffaut | Feb. 13, 1934 |
| 1,960,692 | Brown | May 29, 1934 |
| 2,014,007 | Pailler | Sept. 10, 1935 |
| 2,030,859 | Drapal | Feb. 18, 1936 |
| 2,240,503 | Kettenbach | May 6, 1941 |
| 2,308,883 | Kettenbach | Jan. 19, 1943 |
| 2,314,091 | Jones | Mar. 16, 1943 |

OTHER REFERENCES

Rogers, "Manual of Industrial Chemistry," 6th Ed., vol. 2, published by D. Van Nostrand Co. Inc., New York, New York.

Cupples, "A List of Commercially Available . . . Wetting . . . Agents," mimeographed paper E-504 issued by U. S. Dept. of Agriculture," Bureau of Entomology and Plant Quarantine, June 1940.